(12) United States Patent
Schatzl

(10) Patent No.: US 9,052,055 B2
(45) Date of Patent: Jun. 9, 2015

(54) HOLDING APPARATUS

(71) Applicant: Arnold & Richter Cine Technik GmbH & Co. Betriebs KG, Munich (DE)

(72) Inventor: Gerhard Schatzl, St. Polten (AT)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 182 days.

(21) Appl. No.: 13/857,179

(22) Filed: Apr. 5, 2013

(65) Prior Publication Data

US 2013/0270408 A1    Oct. 17, 2013

(30) Foreign Application Priority Data

Apr. 13, 2012   (DE) .......................... 10 2012 007 474

(51) Int. Cl.
*F16M 11/04* (2006.01)
*F16M 13/02* (2006.01)
*G03B 17/56* (2006.01)

(52) U.S. Cl.
CPC ............. *F16M 13/02* (2013.01); *F16M 11/041* (2013.01); *G03B 17/566* (2013.01)

(58) Field of Classification Search
USPC ............... 248/187.1, 221.11, 222.11, 222.13, 248/223.41, 224.51, 224.61, 224.8, 229.21, 248/230.2, 231.31, 316.2, 316.3; 24/456, 24/461, 490, 491, 492, 516, 517, 536, 537, 24/538; 352/243, 197; 396/419, 425, 428
See application file for complete search history.

(56) References Cited

U.S. PATENT DOCUMENTS

| 3,511,159 | A | | 5/1970 | Hobbs, Jr. |
| 4,687,312 | A | | 8/1987 | Navarro |
| 4,736,921 | A | * | 4/1988 | Zane et al. ................. 248/316.2 |
| 5,020,195 | A | * | 6/1991 | LeVahn ........................... 24/514 |
| 5,360,194 | A | | 11/1994 | Jacobson |

(Continued)

FOREIGN PATENT DOCUMENTS

| DE | 40 18 414 A1 | 12/1991 |
| DE | 201 08 897 U1 | 9/2001 |

(Continued)

OTHER PUBLICATIONS

Translation of German Search Report dated Oct. 30, 2012 relating to German Patent Application No. 10 2012 007 474.3.

(Continued)

*Primary Examiner* — Alfred J Wujciak
(74) *Attorney, Agent, or Firm* — Gifford, Krass, Sprinkle, Anderson & Citkowski, P.C.

(57) ABSTRACT

A holding apparatus for fastening camera accessory parts to a camera system can be fastened to support tubes of the camera system. The holding apparatus comprises a bridge part which has two pairs of openings for receiving support tubes, with the openings of the one pair differing from the openings of the other pair at least with respect to their spacing; at least one pair of clamping elements which are provided at the bridge part and are movable at least between a clamping position and a release position, with the clamping elements locking support tubes received in the openings at the bridge part in the clamping position of said clamping elements; and an actuation device which is configured to move the clamping elements together. The clamping elements have different clamping sections which are configured to lock support tubes of different diameter and/or different spacing at the bridge part.

10 Claims, 2 Drawing Sheets

(56) References Cited

U.S. PATENT DOCUMENTS

| | | | |
|---|---|---|---|
| 5,897,087 A * | 4/1999 | Farley | 248/229.21 |
| 7,575,324 B2 * | 8/2009 | Elias et al. | 352/243 |
| 8,181,928 B2 * | 5/2012 | Ruan | 248/316.1 |

FOREIGN PATENT DOCUMENTS

| | | |
|---|---|---|
| DE | 20 2007 012 388 U1 | 12/2007 |
| DE | 20 2007 012 660 U1 | 9/2008 |
| DE | 10 2010 037 619 A1 | 3/2012 |

OTHER PUBLICATIONS

Internet printout of www.ocon.con/products/camera-accessories/o-grips.html dated Apr. 10, 2013 showing the "Oconnor O-Grips Handgrip System" (3 pages) and www.ocon.com/uploads/pics/C1244-1002-02.jpg showing a detailed image of "o-Grips Rod Bridge" (1 page).

* cited by examiner

HOLDING APPARATUS

CROSS-REFERENCE TO RELATED APPLICATIONS

This application claims priority of German Patent Application DE 10 2012 007 474.3 filed on Apr 13, 2012.

SUMMARY OF THE INVENTION

The present invention relates to a holding apparatus for fastening camera accessory parts to a camera system, with the holding apparatus being fastenable to support tubes of the camera system. The holding apparatus comprises a bridge element which has openings for receiving support tubes and at least one pair of clamping elements which are provided at the bridge part and are movable at least between a clamping position and a release position. In their clamping position the clamping elements lock the received support tubes at the bridge part. The holding apparatus further comprises an actuation device which is configured to move the clamping elements.

Two mutually spaced apart support tubes which extend parallel to the axis of the camera objective can be fastened to the camera for fastening camera accessory parts, for example attachment devices, filters, focus pulling devices, handles or the like, to a camera system. The fastening of the camera support parts at the support tubes takes place with the help of said holding apparatus. For fastening the accessory parts, the bridge part can have one or more fastening devices which can, for example, be screwed in threaded bores of the bridge part.

The locking of the holding apparatus takes place after the setting of the desired spacing from the camera with the aid of the actuation device.

Since support tube systems having different support tube diameters and/or different support tube spacings are common for the fastening of camera accessory parts, it is necessary to have respectively configured holding apparatus available.

It is an object of the present invention to provide a holding apparatus for fastening camera accessory parts to a camera system which is universal in use and simple to operate.

The object is satisfied by a holding apparatus comprising a bridge part which has two pairs of openings for receiving support tubes, with the openings of the one pair differing from the openings of the other pair at least with respect to their spacing; the holding apparatus further comprising at least one pair of clamping elements which are provided at the bridge part and are movable at least between a clamping position and a release position, with the clamping elements being configured to lock support tubes received in the openings at the bridge part in the clamping position of said clamping elements; and the holding apparatus further comprising an actuation device which is configured to collectively move the clamping elements; wherein the clamping elements have different clamping sections which are configured to lock support tubes of different diameter and/or different spacing at the bridge part.

It is thereby possible to use the holding apparatus for different support tube systems without, for instance, different clamping elements matched to the respective dimensions and each having associated actuation devices having to be used. Only one single actuation device can rather be provided which preferably connects the clamping elements in a force-transmitting manner in order to allow a clamping of the clamping elements at the support tubes via the actuation device. The locking can take place in a force-transmitting and/or form-fitted manner. The openings of the bridge part can be peripherally open or closed. It is noted for reasons of completeness that only one respective pair of support tubes is locked at the bridge part.

In accordance with an advantageous embodiment, each pair of openings comprises a first opening and a second opening, with the pair of clamping elements having a first clamping element with a plurality of clamping sections and a second clamping element with a plurality of clamping sections, and wherein the plurality of clamping sections of the first clamping element are associated with the first openings of the two pairs and the plurality of clamping sections of the second clamping element are associated with the second openings of the two pairs. The construction effort is thereby simplified since only one single clamping element has to be used for two openings, which are preferably adjacent. In this embodiment, each clamping element can be movable between at least one first and one second clamping position, with the respective clamping positions being able to be matched to one another such that, in a respective clamping position, a respective specific pair of clamping sections cooperates with a specific pair of openings.

Alternatively or additionally, each clamping element can have at least two clamping sections which are configured to lock support tubes of different diameter at the bridge part, with the at least two clamping sections of the respective clamping element being associated with the same opening of the bridge part. It is hereby achieved that support tubes of different diameter can be reliably locked at the bridge part without there being any risk that the lock is unintentionally released. The at least two clamping sections can for this purpose differ, for example, with respect to their curvature, their orientation and/or their relative position with respect to the respective openings. In this embodiment, the at least two clamping sections of the respective clamping element can be configured to act in different clamping directions. This can be achieved, for example, in that each clamping element is movable between a first and a second clamping position.

Generally, however, a plurality of pairs of clamping elements can also be provided, with each clamping section being able to be provided at a separate clamping element.

In accordance with a further advantageous embodiment of the invention, the clamping elements are displaceable perpendicular to the axis of the support tubes. The displacement can in particular take place in a linear direction.

The clamping elements can be displaceable parallel to a plane defined by the support pipes. Since as a rule the openings are also distributed along this plane, it is possible in a simple manner to lock support tubes respectively selectively introduced in the one or the other pair of openings using the same clamping element.

The clamping elements are preferably displaceable in opposite directions to one another. Clamping elements which can be displaced in opposite directions to one another can be tensioned particularly effectively and reliably due to the force flow which engages around them. Alternatively to this, however, clamping elements can also be used which are movable in the same direction.

Generally, the clamping elements can also be configured as pivotable, with a particularly reliable clamping of the support tubes being able to be achieved while utilizing lever forces.

In accordance with a further advantageous embodiment, the actuation device comprises a threaded drive for moving the clamping elements, with the threaded drive having a spindle which is rotationally fixedly coupled to a knob at one end. Such a threaded drive can be actuated in a simple manner and has a sufficient self-locking in addition to a high clamping force so that an unintentional movement of the clamping elements is reliably prevented.

The spindle can have a threaded section and an abutment section, with the threaded section cooperating with one of the clamping elements and the abutment section cooperating with another of the clamping elements in order to be able to tension the named clamping elements at the support tubes via the threaded bar. The tensioning in particular takes place by pulling, i.e. by a reduction in the spacing of the clamping elements and/or by compression, i.e. by an increase in the spacing of the clamping elements. For example, the initially mentioned action of the clamping elements in different clamping directions can thus be achieved, with the first clamping position mentioned in this connection corresponding to a pull tensioning and the second clamping position corresponding to a compression tensioning.

Alternatively, the actuation device can comprise a knee-lever arrangement for moving the clamping elements.

Further advantageous embodiments of the invention are set forth in the dependent claims, in the description and in the drawings.

BRIEF DESCRIPTION OF THE DRAWINGS

The invention will be described in the following with reference to an embodiment and to the drawings.

DETAILED DESCRIPTION OF THE PREFERRED EMBODIMENTS

Figure 1:
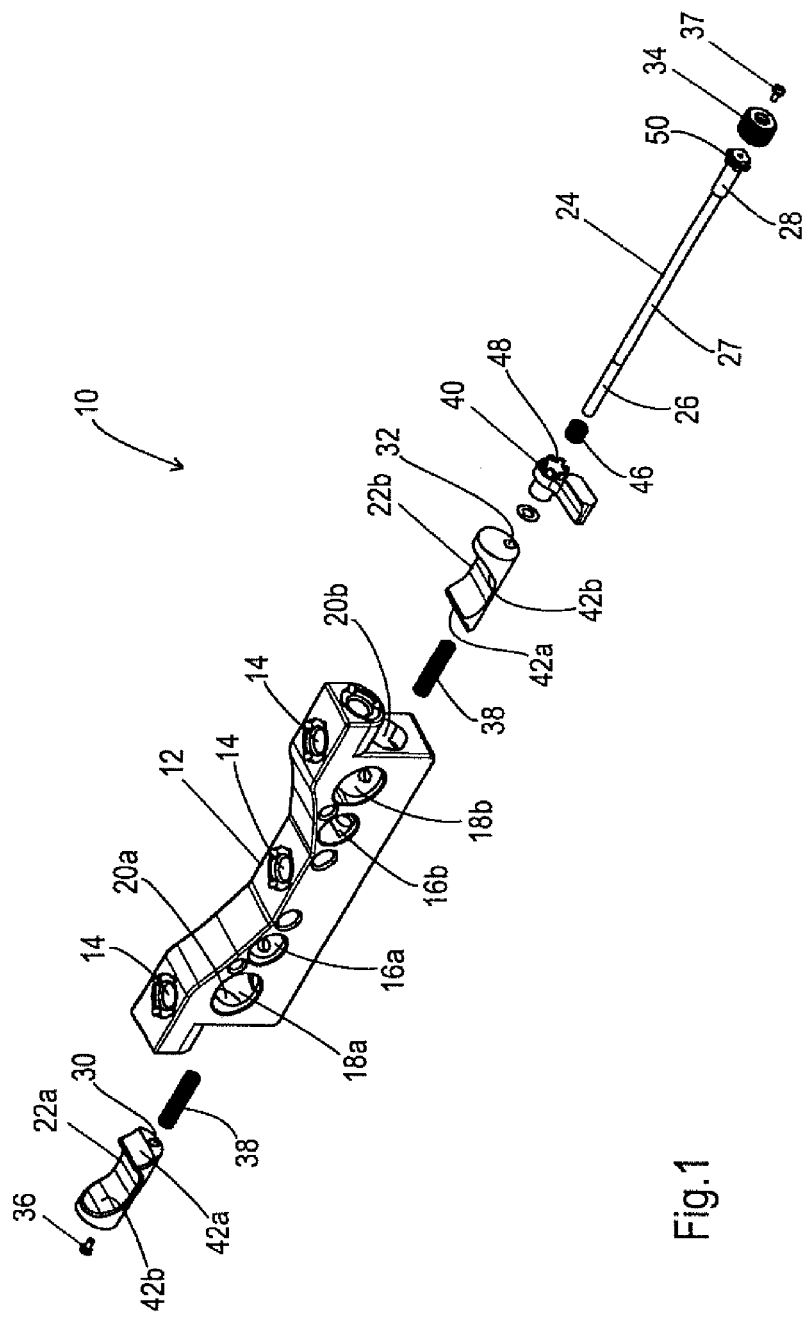
FIG. 1 shows an exploded representation of a holding apparatus in accordance with the invention.
Figure 2:
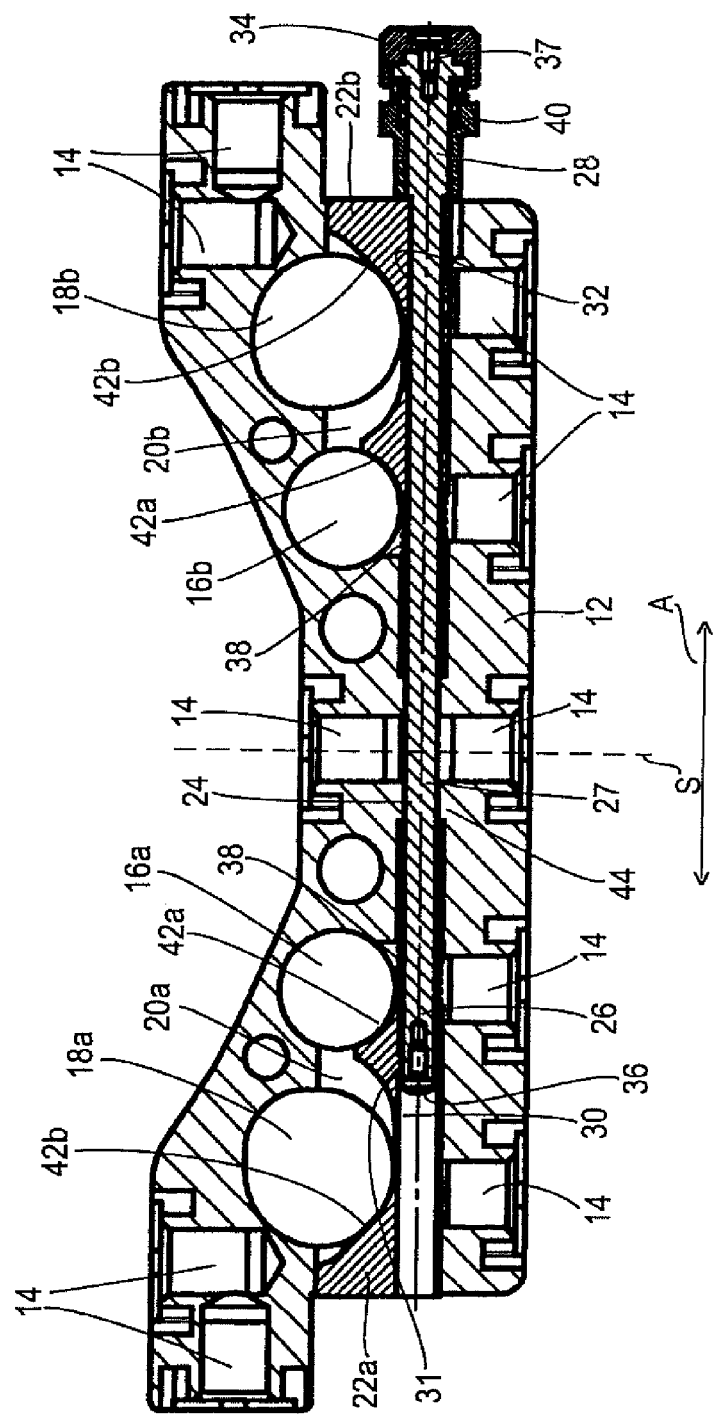
FIG. 2 shows a longitudinal section through the holding apparatus.

FIGS. 1 and 2 show an exemplary holding apparatus 10 for fastening camera accessory parts to a camera system (not shown) in accordance with the present invention. The holding apparatus 10 comprises a bridge part 12 which extends along a longitudinal axis A (FIG. 2) and which is configured substantially in mirror inversion with respect to an axis of symmetry S extending perpendicular to the longitudinal axis A.

The bridge part 12 is provided with a plurality of bores 14 which can have an internal thread so that camera accessory parts (not shown) can be connected to the holding apparatus 10 with the aid of suitable fastening devices (not shown). The bores 14 can be configured as blind bores or as throughgoing bores or openings.

For the reception of support tubes (not shown), the bridge part 12 has an inner pair of openings 16a, 16b and an outer pair of openings 18a, 18b having an approximately cylindrical cross-section which are distributed along the longitudinal axis A and which extend through the bridge part 12 perpendicular to the longitudinal axis A and to the axis of symmetry S. The inwardly disposed openings 16a, 16b have a smaller diameter than the outwardly disposed openings 18a, 18b.

Support tubes can be received in the openings 16a, 16b, 18a, 18b pairwise with different tube diameters and with a different mutual spacing.

The exemplary holding apparatus 1 can be selectively used in the present configuration for one of three different support tube systems, namely for a first support tube system having a support tube diameter of 15 mm and a support tube spacing of 60 mm, for a second support tube system having a support tube diameter of 15 mm and a support tube spacing of 100 mm, or for a third support tube system having a support tube diameter of 19 mm and a support tube spacing of 104 mm.

The openings 16a, 16 are provided for receiving support tubes of the first support tube system and their inner diameter expediently amounts to somewhat more than 15 mm, whereas support tubes of the second and third support tube systems can be received in the openings 18a, 18b whose inner diameter expediently amounts to somewhat more than 19 mm.

The bridge part 12 furthermore has cylindrical guides 20a, 20b having a basically cylindrical cross-section which extend in the direction of the longitudinal axis A and which intersect the openings 16a, 18a or the openings 16b, 18b.

A respective clamping element 22a and 22b respectively are received displaceably in the direction of the longitudinal axis A in the guides 20a, 20b, with the cross-section of the clamping elements 22a, 22b basically likewise being cylindrical. Part regions of the clamping element 22a, 22b are, however, provided with cut-outs so that a free passage of the support pipes through the openings 16a, 16b, 18a, 18b is given in dependence on the movement position of the clamping elements 22a, 22b. The cooperation of the clamping elements 22a, 22b with the support tubes will be explained in even more detail below.

The clamping elements 22a, 22b are displaceable with the aid of an actuation device which includes a threaded drive. The threaded drive has a spindle 24 which has a threaded section 26 provided with an external thread at its one end and an abutment section 28 at its other end. A thread-free center section 27 extends between the threaded section 26 and the abutment section 28. The diameter of the abutment section 28 is increased in size with respect to the diameter of the center section 27.

The clamping element 22a has a threaded opening 30 having an internal thread section 31 into which the threaded section 26 of the spindle 24 is screwed. A screw 36 provided at the end face at the threaded section 26 serves as a security against overtwist for the spindle 24. The center section 27 of the spindle 24 extends through a passage 44 provided in the bridge part 12 and through a leadthrough 32 provided in the clamping element 22b. The diameter of the leadthrough 32 is only slightly larger than the diameter of the center section 27, but smaller than the diameter of the abutment section 28 so that the abutment section 28 of the spindle 24 abuts the outer side of the clamping element 22b. The threaded opening 30 of the clamping element 22a and the leadthrough 32 of the clamping element 22b are arranged eccentrically with respect to the axis of the guides 20a, 20h so that the clamping elements 22a, 22b are admittedly axially displaceable in the guides 20a, 20b, but are supported in a rotationally fixed manner.

The spindle 24 is movable by means of a cylindrical knob 34, for example a knurled knob. The knob 34 is rotationally fixedly connected to the abutment section 28 of the spindle 24 and is secured by means of a screw 37.

The spindle 24 can be rotated relative to the threaded opening 30 of the clamping element 22a by an actuation of the knob 34, whereby the internal thread section 31 of the clamping element 22a migrates along the spindle 24. The spacing between the clamping element 22a serving as a spindle nut and the clamping element 22b which contacts the abutment section 28 of the spindle 24 is hereby reduced. The clamping elements 22a, 22b can thus be moved in opposite directions, i.e. toward one another.

In the region of the center section 27, two compression springs 38 are furthermore provided which are active between the bridge part 12 and the clamping element 22a and 22b respectively and preload the clamping elements 22a, 22b in outwardly facing directions. On an actuation of the handle 34 in the opposite direction, the spindle 24 can be unscrewed from the threaded opening 30, whereby the spacing between the clamping elements 22a and the abutment section 28 of the spindle 24 increases in size. The clamping elements 22a, 22b are in this respect moved outwardly by the force of the compression springs 38.

A clamping lever 40 is axially displaceably held on the abutment section 28. The clamping lever 40 has a crown gear 48 (FIG. 1) at the outer end face which can selectively be brought into engagement with a corresponding toothed arrangement 50 provided at the abutment section 28 in the region of the knob 34. A compression spring 46 acts between the clamping lever 40 and the spindle 24 and preloads the clamping lever 40 in the direction of an idle position in which the crown gear 48 is out of engagement with the toothed arrangement 50 and the clamping lever 40 is supported freely rotatable on the abutment section 28. The clamping lever 40 has to be pulled against the force of the compression spring 46 in the direction of the knob 34 for setting a coupling position between the clamping lever 40 and the spindle 40.

Two clamping sections 42a 42b which serve for locking the support tubes in the openings 16a, 16b, 18a, 18b are formed by suitable cut-outs in each of the two clamping elements 22a, 22b and are inclined with respect to the longitudinal axis A and are arched concavely. The respective clamping sections 42a, 42b are displaced from one another along the longitudinal axis A. The two clamping sections 42a are associated with the two inner openings 16a, 16b and are configured to lock support tubes of the first support tube system in the openings 16a, 16b. The two clamping sections 42b are associated with the two outer openings 18a, 18b and are configured selectively to lock support tubes of the second support tube system having a support tube diameter of 15 mm or of the third support tube system having a diameter of 19 mm.

The spindle 24 can be screwed into the threaded opening 30 of the clamping element 22a by the named actuation of the knob 34 so that the clamping elements 22a, 22b are displaced from a release position, such as is shown in FIG. 2, in each case inwardly (i.e. toward one another) into a clamping position. In this respect, the clamping sections 42a, 42b move so far into the respective openings 16a, 16b and 18a, 18b respectively until the clamping sections 42a, 42b impact a support tube received there. A tension is built up by a further rotation of the spindle 24 so that the support tubes are clamped in the openings 16a, 16h and 18a, 18b respectively of the bridge part 12.

It is of advantage in this respect that the user only needs to actuate one single knob 34 to lock two support tubes of a support tube system simultaneously at the bridge part 12. By the use of an actuation device (spindle 24) extending along the longitudinal axis A of the bridge part 12, the knob 34 is arranged at an easily reachable, ergonomically favorable position in which it also does not impede the attachment of camera accessory parts at the bridge part 12 (bores 14). A further advantage is that the force flow for the tensioning of the clamping elements 22a, 22b at the support tubes runs over the spindle 24 (as a common actuation device). For a floating support of the unit comprising the two clamping elements 22a, 22b and the spindle 24 is hereby formed in the bridge part 12 which ensures a uniform force distribution. The two clamping elements 22a, 22b are configured separately and movable in opposite directions for this purpose.

If support tubes having a diameter of 15 mm are received in the inner openings 16a, 16b or support tubes having a diameter of 19 mm are received in the outer openings 18a, 18b, only a relatively small movement path of the clamping elements 22a, 22b is required until the clamping sections 42a or 42b contact the support tubes. This corresponds to a first clamping position. If, however, support tubes having a diameter of only 15 mm are to be clamped in the outer openings 18a, 18b, a larger movement path is required until the clamping sections 42b contact the support tubes. This corresponds to a second clamping position. A fast and ergonomic movement of the spindle 24 is possible with the aid of the cylindrical knob 34 in this respect.

Only when a higher torque is required for the actual clamping procedure or for releasing the clamping connection can the clamping lever 40 be moved as required briefly into its coupling position without this, however, constantly impairing the operation of the knob 34.

The invention claimed is:

1. A holding apparatus for fastening camera accessory parts to a camera system, wherein the holding apparatus can be fastened to support tubes of the camera system,
    said holding apparatus comprising:
    a bridge part which has two pairs of openings for receiving support tubes, wherein the openings of the one pair differ from the openings of the other pair at least with respect to their spacing;
    at least one pair of clamping elements which are provided in the bridge part and can be moved between at least a clamping position and a release position, with the clamping elements being configured to lock support tubes received in the openings in the bridge part in the clamping position of said clamping elements; and
    an actuation device which is configured to collectively move the clamping elements,
    wherein the clamping elements have different clamping sections which are configured to lock support tubes having at least one of a different diameter and a different spacing.

2. A holding apparatus in accordance with claim 1,
    wherein each pair of openings comprises a first opening and a second opening, wherein the pair of clamping elements has a first clamping element with a plurality of clamping sections and a second clamping element with a plurality of clamping sections, and wherein the plurality of clamping sections of the first clamping element are associated with the first openings and the plurality of clamping sections of the second clamping element are associated with the second openings.

3. A holding apparatus in accordance with claim 1,
    wherein each clamping element has at least two clamping sections which are configured to lock support tubes of different diameter to the bridge part, with the at least two clamping sections of the respective clamping element being associated with the same opening of the bridge part.

4. A holding apparatus in accordance with claim 3,
    wherein the at least two clamping sections of the respective clamping element are configured to act in different clamping directions.

5. A holding apparatus in accordance with claim 1,
    wherein the clamping elements are displaceable perpendicular to the axis of the support tubes.

6. A holding apparatus in accordance with claim 1,
    wherein the clamping elements are displaceable in parallel to a plane defined by the support tubes.

7. A holding apparatus in accordance with claim 1,
    wherein the clamping elements are displaceable in opposite directions to or in the same direction as one another.

8. A holding apparatus in accordance with claim 1,
    wherein the actuation device comprises a threaded drive for moving the clamping elements, with the threaded drive having a spindle which is rotationally fixedly coupled to a knob at one end.

9. A holding apparatus in accordance with claim 8, wherein the spindle has a threaded section and an abutment section, with the threaded section cooperating with one of the clamping elements and the abutment section cooperating with another of the clamping elements to be able to tension the named clamping elements at the support tubes via the spindle.

10. A holding apparatus in accordance with claim 1, wherein the clamping elements are preloaded in the direction of their release position.

* * * * *